(12) United States Patent
Billingham et al.

(10) Patent No.: US 6,378,332 B1
(45) Date of Patent: Apr. 30, 2002

(54) PACKING WITH LOW CONTACTING CRIMP PATTERN

(75) Inventors: John Fredric Billingham, Getzville; Michael James Lockett, Grand Island, both of NY (US)

(73) Assignee: Praxair Technology, Inc., Danbury, CT (US)

(*) Notice: Subject to any disclaimer, the term of this patent is extended or adjusted under 35 U.S.C. 154(b) by 71 days.

(21) Appl. No.: 09/657,007

(22) Filed: Sep. 7, 2000

(51) Int. Cl.⁷ ................................................. F25J 1/00
(52) U.S. Cl. ........................ 62/643; 62/905; 261/112.2
(58) Field of Search .................... 62/643, 903, 905; 261/112.2

(56) References Cited

U.S. PATENT DOCUMENTS

| | | | |
|---|---|---|---|
| 4,296,050 A | 10/1981 | Meier | 261/112 |
| 4,455,339 A | 6/1984 | Meier | 428/185 |
| 4,732,713 A | 3/1988 | Korsell | 261/112 |
| 4,915,878 A | 4/1990 | György | 261/112.2 |
| 4,929,399 A | 5/1990 | Lockett et al. | 261/112.2 |
| 5,132,056 A | 7/1992 | Lockett et al. | 261/112.2 |
| 5,267,444 A * | 12/1993 | Lehman et al. | 62/905 |
| 5,413,741 A | 5/1995 | Buchholz et al. | 261/112.2 |
| 5,632,934 A | 5/1997 | Billingham et al. | 261/112.2 |
| 5,857,357 A * | 1/1999 | Bonaquist et al. | 62/643 |
| 5,876,638 A | 3/1999 | Sunder et al. | 261/112.2 |
| 5,921,109 A | 7/1999 | Billingham et al. | 62/643 |
| 6,101,841 A | 8/2000 | Billingham et al. | 62/643 |
| 6,128,922 A * | 10/2000 | Dean et al. | 62/643 |

* cited by examiner

Primary Examiner—Ronald Capossela
(74) Attorney, Agent, or Firm—Stanley Ktorides

(57) ABSTRACT

A corrugated structured packing for forming into modules for use in a rectification column, having both high and low corrugations which reduce the contact points when formed into modules, serving to improve mass transfer effectiveness and thus reduce the requisite column height.

4 Claims, 5 Drawing Sheets

PACKING WITH LOW CONTACTING CRIMP PATTERN

TECHNICAL FIELD

This invention relates generally to structured packing which is particularly useful for use in carrying out rectification, especially cryogenic rectification.

BACKGROUND ART

Cross-corrugated, sheet metal structured packings have gained a considerable portion of the distillation column internals business since coming into widespread commercial use approximately fifteen years ago. These structured packings are commonly recognized as being more efficient than random packings, based on their lower pressure drop per theoretical stage of separation. They have also replaced trays in some applications, primarily because of their higher capacity in a given column diameter, at least at low to medium liquid rates.

One industry where structured packings have had a major impact is the cryogenic air separation industry. The primary advantage of structured packings in cryogenic air separation is that the pressure drop over the columns may be an order of magnitude lower than when using the previous column internals of choice in cryogenic air separation columns, which were trays. This reduces the operating pressure of the columns, which in turn drops the pressure to which air must be compressed and thus the power requirements for the plant.

Meier (U.S. Pat. No. 4,296,050) describes the majority of structured packings sold commercially to this point, which are cross-corrugated sheets containing both apertures and fluting (a form of surface texture). Since the nearly twenty years since this patent, numerous attempts to improve on the basic structure of the structured packing have been published. However, none appear to have had a significant commercial impact until Billingham et al. (U.S. Pat. No. 5,632,934). It was recognized in this patent that flooding of structured packings was initiated at the interface between layers and that this bottleneck could be removed by reducing the pressure drop of gas in the base of each brick. Since the issuance of this patent, two products have been commercialized that use the ideas put forward in this patent.

One problem with structured packings is that the amount of mass transfer per unit height does not scale proportional to the surface area density, a. (Area density is also termed the specific surface area and is the surface area of the packing per unit volume of the packing.) In other words, doubling the amount of surface area per unit volume does not halve the height required to effect a given separation. This is particularly true at high area densities ($a<400$ $m^2/m^3$).

Accordingly, it is an object of this invention to provide corrugated structured packing, having an improvement over conventional corrugated structured packing, which enables separation such as cryogenic rectification to be carried out over a reduced column height.

SUMMARY OF THE INVENTION

The above and other objects, which will become apparent to those skilled in the art upon a reading of this disclosure, are attained by the present invention, one aspect of which is:

A corrugated structured packing sheet having a plurality of high corrugations each high corrugation having a corrugation height equal to the crimp height, and having a plurality of low corrugations each low corrugation having a corrugation height less than the crimp height.

Another aspect of the invention is:

A module comprising a plurality of vertically oriented corrugated structured packing sheets, each structured packing sheet having a plurality of high corrugations each high corrugation having a corrugation height equal to the crimp height of the packing sheet and having a plurality of low corrugations each low corrugation having a corrugation height less than the crimp height, said corrugated structured packing sheets stacked side by side with the direction of the corrugations reversed in neighboring sheets, said neighboring sheets contacting each other at their high corrugations and being spaced from each other at their low corrugations.

A further aspect of the invention is:

A method for carrying out rectification comprising:

(A) passing a feed mixture comprising a more volatile component and a less volatile component into a column containing a plurality of modules, each module comprising a plurality of vertically oriented corrugated structured packing sheets, each structured packing sheet having a plurality of high corrugations each high corrugation having a corrugation height equal to the crimp height of the packing sheet and having a plurality of low corrugations each low corrugation having a corrugation height less than the crimp height, said corrugated structured packing sheets stacked side by side with the direction of the corrugations reversed in neighboring sheets, said neighboring sheets contacting each other at their high corrugations and being spaced from each other at their low corrugations;

(B) carrying out rectification within the column wherein vapor flows upward through the modules and liquid flows downward through the modules whereby the said more volatile component concentrates in the upflowing vapor and the said less volatile component concentrates in the downflowing liquid; and (C) withdrawing first fluid from the upper portion of the column, said first fluid having a concentration of more volatile component which exceeds that of the feed mixture, and withdrawing second fluid from the lower portion of the column, said second fluid having a concentration of less volatile component which exceeds that of the feed mixture.

The term "column" as used herein means a distillation or fractionation column or zone, i.e. a contacting column or zone wherein liquid and vapor phases are countercurrently contacted to effect separation of a fluid mixture, as for example, by contacting of the vapor and liquid phases on packing elements. For a further discussion of distillation columns see the Chemical Engineers' Handbook, Fifth Edition, edited by R. H. Perry and C. H. Chilton, McGraw-Hill Book Company, New York, Section 13, "Distillation" B. D. Smith, et al., page 13–3 *The Continuous Distillation Process*. Vapor and liquid contacting separation processes depend on the difference in vapor pressures for the components. The high vapor pressure (or more volatile or low boiling) component will tend to concentrate in the vapor phase whereas the low vapor pressure (or less volatile or high boiling) component will tend to concentrate in the liquid phase. Distillation is the separation process whereby heating of a liquid mixture can be used to concentrate the more volatile component(s) in the vapor phase and thereby the less volatile component(s) in the liquid phase. Partial condensation is the separation process whereby cooling of a vapor mixture can be used to concentrate the more volatile component(s) in the vapor phase and thereby the less volatile component(s) in the liquid phase. Rectification, or continuous distillation, is the separation process that combines successive partial vaporizations and condensations as obtained by a countercurrent treatment of the vapor and liquid phases. The countercurrent contacting of the vapor and liquid phases can be adiabatic or nonadiabatic and can include integral (stagewise) or differential (continuous) contact between the phases. Separation process arrangements that utilize the principles of rectification to separate mixtures are often interchangeably termed rectification columns, distillation columns, or fractionation columns. Cryogenic rectification is rectification carried out, at least in part, at temperatures below 150° K.

As used herein the term "packing" means any solid or hollow body of predetermined configuration, size and shape used as column internals to provide surface area for the liquid to allow mass transfer at the liquid-vapor interface during countercurrent flow of the two phases.

As used herein the term "structured packing" means diagonally cross-corrugated packing wherein individual members have specific orientation relative to each other and to the column axis.

As used herein the terms "upper portion" and "lower portion" of a column mean those sections of the column respectively above and below the mid point of the column.

As used herein the term "corrugation" means a fold, either ridge or a trough, on a packing sheet.

As used herein the term "centerline" means the line formed if a corrugated structured packing sheet were flattened so as to remove all the corrugations.

As used herein the term "apex" means the furthest perpendicular distance of a corrugation from the centerline of the packing sheet.

As used herein the term "corrugation height" means the perpendicular distance from the centerline to the apex of that corrugation.

As used herein the term "crimp height" means the longest corrugation height of a packing sheet.

DETAILED DESCRIPTION

The invention will be described in detail with reference to the Drawings.

Cross-corrugated structured packing sheets are formed into bricks or modules. Each brick comprises a plurality of vertically orientated, diagonally cross-corrugated packing sheets. The sheets are stacked, side-by-side, such that the direction of the corrugation is reversed in neighboring sheets. In so doing, the sheets define a plurality of crossing passages through which rising gas can flow. The bricks of packing are installed into a column as layers that fill the cross sectional area of the column. Each layer may be a single brick or, in larger columns, several bricks that when placed side-by-side fit a circular cross-section. These layers are stacked, one on top of the other, to give the required packed height. Adjacent layers are rotated such that the sheets in the bricks comprising the layers are not parallel. The degree of rotation is between 45 and 90 degrees, and more typically 90 degrees.

Figure 1:
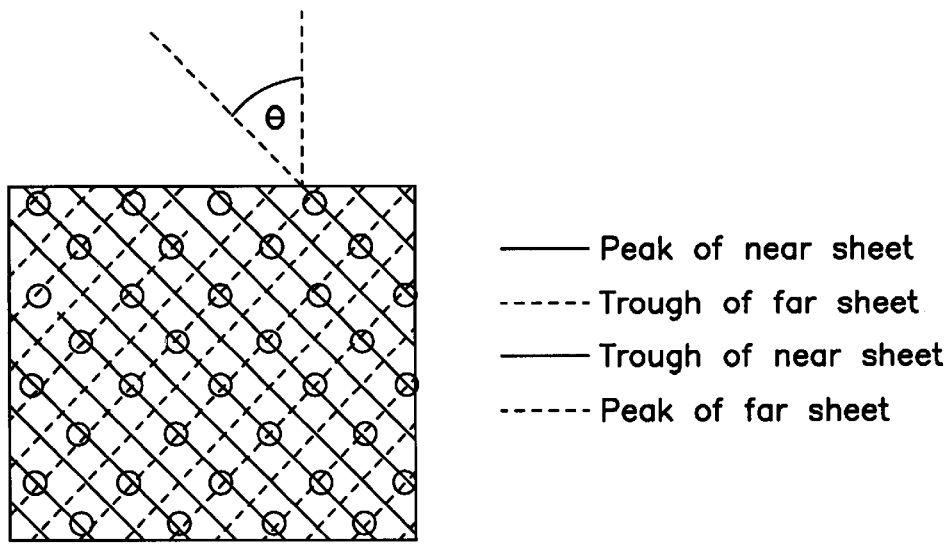
FIG. 1 is a side view illustrating the contact points of two sheets of conventional structured packing wherein one sheet is in back of the other.
Figure 2:
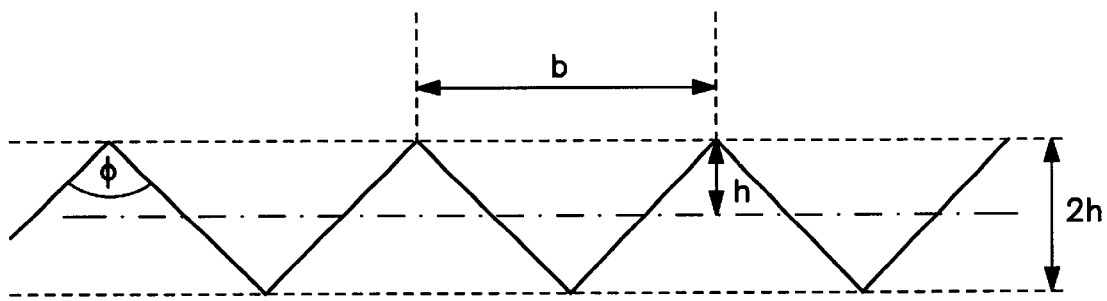
FIG. 2 is a view taken in a plane perpendicular to the corrugation direction of a conventional structured packing sheet.

The mass transfer performance of structured packing is known to depend on a number of variables. One variable that has not received significant attention is the number of contact points per unit volume of packing. A contact point occurs where the corrugations of one sheet contact the corrugations of an adjacent sheet. This is illustrated in FIG. 1. A sheet is shown in side view. The solid diagonal lines represent the peaks and troughs of the corrugations. FIG. 2 shows a conventional crimp pattern for structured packing. The view is taken in a plane that is perpendicular to the corrugation direction. Referring back to FIG. 1, dotted lines represent the peaks and troughs of a single neighboring sheet placed behind the first sheet. The corrugations of this sheet have an opposite orientation to the first sheet. The contact points between the two sheets are shown as circles.

Contact points add structural rigidity to the packing. They also provide points at which liquid can transfer from one sheet to another. This mixing is beneficial in that it alleviates the effects of differences in liquid composition between sheets. More importantly, there will be a net liquid transfer from the sheet with the highest liquid rate to the one with lower liquid rate. This smoothes liquid flows, gpm/ft, from sheet to sheet and minimizes maldistribution. Maldistribution is a term used to describe variations across a horizontal plane of both the flow and composition of the gas and liquid. It is well known that maldistribution is detrimental to the mass transfer performance of packed columns.

For the crimp pattern shown in FIG. 2, height $2h$, is shown as the distance between a peak and trough, measured perpendicular to the centerline. The wavelength, b, is the horizontal distance between two peaks. Now consider packing that is geometrically similar but half the size (half the height, half the wavelength). This packing will have twice the area density. However, it has eight times the contact points per unit volume, and four times the contact points per unit area of packing. For example, consider a packing with a triangular crimp pattern with area density equal to 250 $m^2/m^3$, a wavelength to crimp height ratio, b/h, equal to 4 and a corrugation angle θ (measured to the vertical) of 45 degrees. The number of contact points for this packing is 86,300 $m^{-3}$. Next, consider a packing with a=500 $m^2/m^3$, θ=45 degrees and b/h=4. The number of contact points for this packing is 691,000 $m^{-3}$.

As stated previously, contact points have several benefits. This invention comprises the recognition that contact points also have a drawback in that each contact point represents a dead area that is less effective in mass transfer than the average value for the remainder of the packing. One mechanism for this is that the liquid film thickens and stagnates at the contact point, as compared to the liquid film flowing in the remainder of the packing, due to capillary action.

Figure 3:
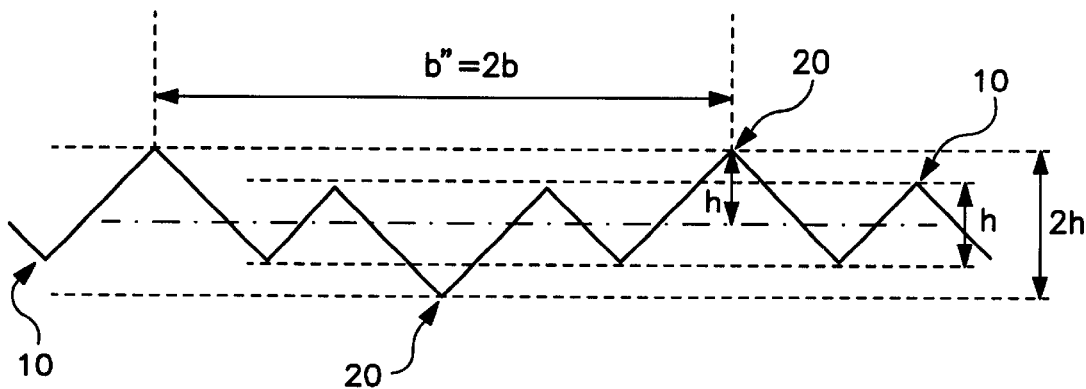
FIG. 3 is a view taken in a plane perpendicular to the corrugation direction of one embodiment of a sheet of structured packing of the invention.
Figure 4:
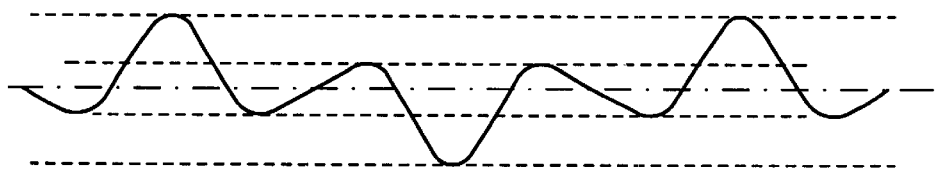
FIG. 4 is a view taken in a plane perpendicular to the corrugation direction of another embodiment of a sheet of structured packing of the invention.
Figure 5:
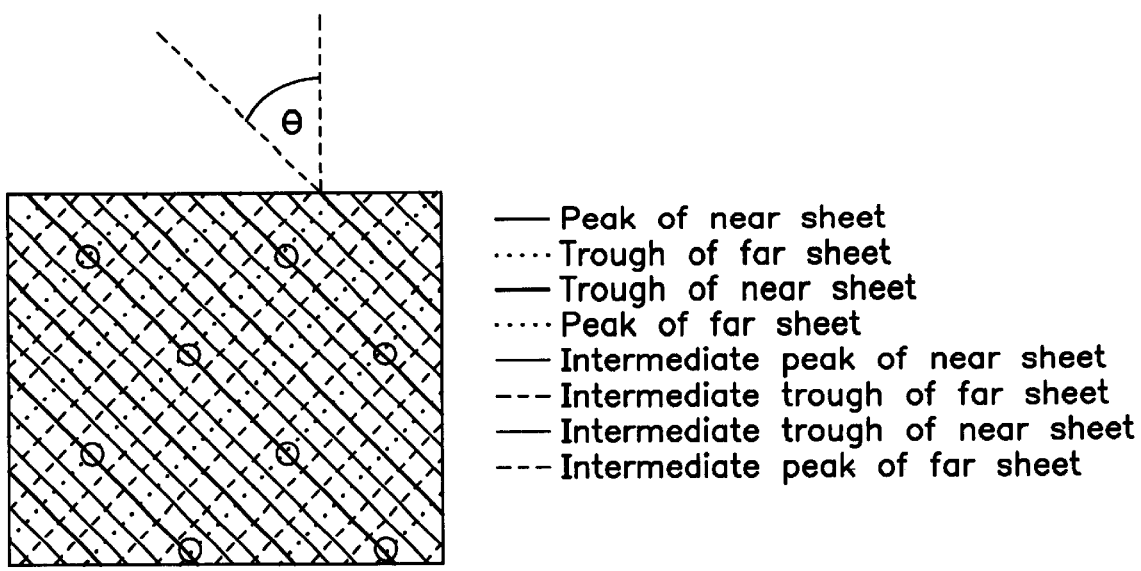
FIG. 5 is a side view illustrating the contact points and non-contact points at the corrugations of neighboring sheets of this invention wherein one sheet is in back of the other.
Figure 7:
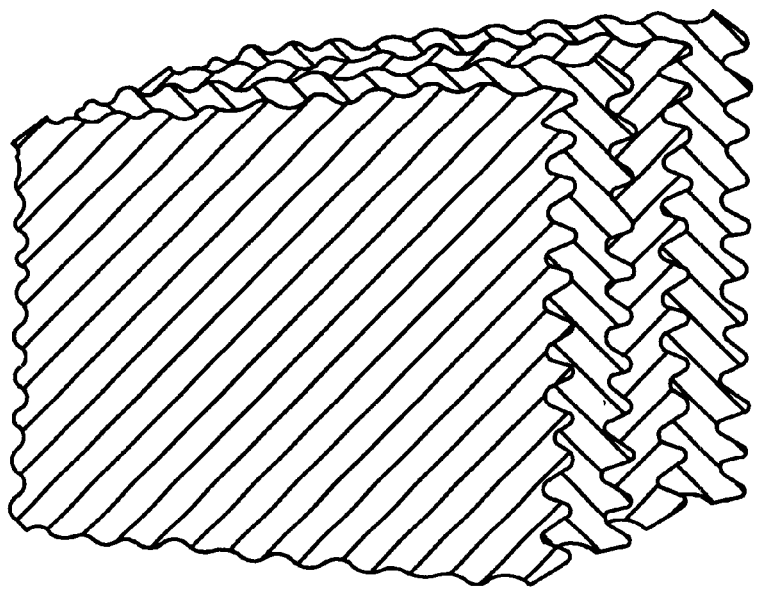
FIG. 7 is a simplified representation of structured packing sheets arranged in a module.

The invention reduces the contact points between neighboring or adjacent structured packing sheets in a module while maintaining the surface area of the packing and the direction of the fluid flow path by providing additional corrugations between the peaks and troughs of a packing sheet that contact neighboring sheets. Preferably in the invention the crimp pattern has at least one local maximum and/or local minimum between the two corrugations that have extremities that touch adjacent sheets. Examples of structured packing sheets of this invention are shown in FIGS. 3 and 4. FIG. 3 illustrates triangular crimp pattern and FIG. 4 illustrates a sinusoidal crimp pattern. For the packing illustrated in FIG. 3, there is obtained the same area density as is obtained for the crimp pattern illustrated in FIG. 2 but there are only one eighth the contact points per unit volume. Also as shown in FIG. 3 the preferred corrugation height of the low corrugations 10 is within the range of from 5 to 95 percent, more preferably about 50 percent of the crimp height defined by the high corrugations 20. The structured packing sheets of this invention are arranged in bricks or modules as shown in FIG. 7 and then installed in a column.

Figure 8:
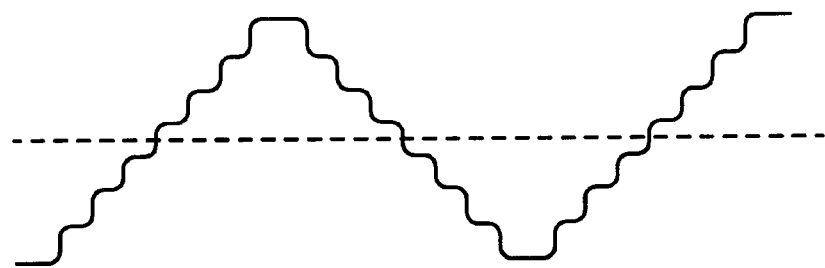
FIG. 8 is a simplified representation of structured packing showing a crimp pattern with surface texture which illustrates the difference between crimp pattern and surface texture.

It is important to make a distinction between surface texture and the crimp pattern. Surface textures, such as is shown in FIG. 8, are applied to all commercially available sheet metal structured packings. The aim of this texture is to promote liquid spreading and thus utilize all of the available packing area for mass transfer. There are various types of surface texture. The most common type is fluting, where the sheet material contains waves that are generally sinusoidal in nature. The texture is applied to the base material, through rolling or pressing, prior to applying the crimp that forms the basic structure of the packing. Since the aim of the texture is to spread liquid, the scale of the texture is on the order of the thickness of the liquid film. As such, the dimensions of the texture are significantly smaller than the dimensions of the crimp pattern. One can think of the texture as being superimposed on the actual crimp pattern. It is the latter that defines macroscopic geometry of the structured packing and the passages for gas flow. FIGS. 3 and 4 show a crimp pattern in the absence of texture. In order to better distinguish crimp pattern from texture, all modifications to the base material, that result in a difference in height, measured perpendicular to the centerline, between two adjacent corrugations that is less than 5 percent of the crimp height, are considered to be texture and are ignored in the description of the crimp pattern.

Figure 6:
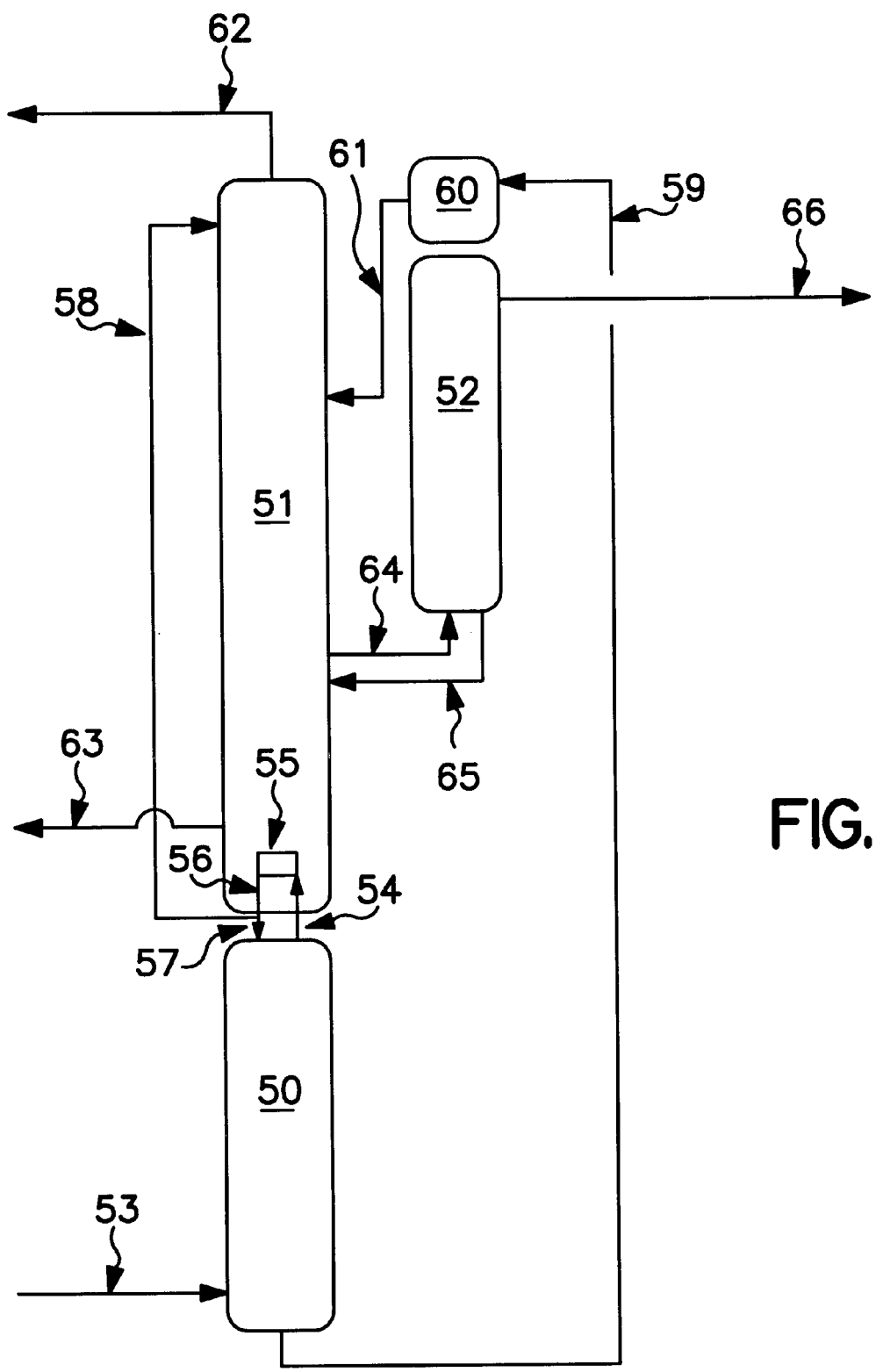
FIG. 6 is a simplified representation of one column arrangement wherein the method of this invention may be carried out.

FIG. 6 illustrates in simplified form a cryogenic air separation plant wherein feed air is separated into one or more products. The feed air comprises, inter alia, oxygen, nitrogen and argon. Nitrogen is more volatile than either argon or oxygen, and argon is more volatile than oxygen. In the arrangement illustrated in FIG. 6, nitrogen, oxygen and crude argon are produced using a cryogenic air separation plant comprising a higher pressure column 50, a lower pressure column 51 and an argon sidearm column 52. One or more of columns 50, 51 and 52 are filled with vertically stacked modules of this invention. Preferably all three of the columns are filled with vertically stacked modules of this invention.

Referring now to FIG. 6, feed air 53 is passed into column 50 wherein it is separated by cryogenic rectification into nitrogen-enriched vapor and oxygen-enriched liquid. Nitrogen-enriched vapor is passed as stream 54 into main condenser 55 wherein it is condensed by indirect heat exchange with column 51 bottom liquid. Resulting nitrogen-enriched liquid 56 is passed into column 50 as reflux liquid 57 and into column 51 as reflux liquid 58. Oxygen-enriched liquid is passed in stream 59 into argon condenser 60 wherein it is at least partially vaporized and then passed into column 51 as shown by stream 61. Within column 51 the various feeds are separated by cryogenic rectification into product nitrogen, which is recovered in stream 62, and into product oxygen which is recovered in stream 63. A side stream 64 is passed from column 51 into column 52 wherein it is separated into argon richer fluid and oxygen-richer fluid. The oxygen-richer fluid is passed into column 51 in stream 65 and the argon-richer fluid, after being processed in whole or in part in condenser 60, is recovered as crude argon in stream 66.

Although the invention has been described in detail with reference to certain preferred embodiments those skilled in the art will recognize that there are other embodiments of the invention within the spirit and the scope of the claims. For example, the structured packing sheets of this invention may have a lower region which differs in structure from the remaining portion of that sheet so that, when the structured packing sheets are formed into modules, the resistance to vapor flow in the lower region is less than the resistance to vapor flow in the remaining region, thereby serving to improve the capacity of the packing.

What is claimed is:

1. A method for carrying out rectification comprising:

(A) passing a feed mixture comprising a more volatile component and a less volatile component into a column containing a plurality of modules, each module comprising a plurality of vertically oriented corrugated structured packing sheets, each structured packing sheet having a plurality of high corrugations each high corrugation having a corrugation height equal to the crimp height of the packing sheet and having a plurality of low corrugations each low corrugation having a corrugation height less than the crimp height, said corrugated structured packing sheets stacked side by side with the direction of the corrugations reversed in neighboring sheets, said neighboring sheets contacting each other at their high corrugations and being spaced from each other at their low corrugations;

(B) carrying out rectification within the column wherein vapor flows upward through the modules and liquid flows downward through the modules whereby the said more volatile component concentrates in the upflowing vapor and the said less volatile component concentrates in the downflowing liquid; and (C) withdrawing first fluid from the upper portion of the column, said first fluid having a concentration of more volatile component which exceeds that of the feed mixture, and withdrawing second fluid from the lower portion of the column, said second fluid having a concentration of less volatile component which exceeds that of the feed mixture.

2. The method of claim 1 comprising modules having corrugated structured packing sheets wherein the corrugation height of the low corrugations of that sheet is within the range of from 5 to 95 percent of the crimp height of that sheet.

3. The method of claim 1 wherein the rectification is cryogenic rectification.

4. The method of claim 3 wherein the mixture comprises at least two of oxygen, nitrogen and argon, wherein nitrogen is more volatile than either argon or oxygen, and argon is more volatile than oxygen.

* * * * *

UNITED STATES PATENT AND TRADEMARK OFFICE
CERTIFICATE OF CORRECTION

PATENT NO. : 6,378,332 B1  Page 1 of 1
DATED : April 30, 2002
INVENTOR(S) : Billingham et al.

It is certified that error appears in the above-identified patent and that said Letters Patent is hereby corrected as shown below:

Column 1,
Line 52, delete "(a < 400 $m^2/m^3$)" and insert therefor -- (a > 400 $m^2/m^3$) --.

Signed and Sealed this

Tenth Day of September, 2002

Attest:

Attesting Officer

JAMES E. ROGAN
*Director of the United States Patent and Trademark Office*